United States Patent
Yamamoto et al.

(10) Patent No.: US 7,330,616 B2
(45) Date of Patent: Feb. 12, 2008

(54) MICROMIRROR ELEMENT AND OPTICAL SWITCH

(75) Inventors: Tsuyoshi Yamamoto, Kawasaki (JP); Shinichi Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/952,761

(22) Filed: Sep. 30, 2004

(65) Prior Publication Data

US 2005/0220394 A1    Oct. 6, 2005

(30) Foreign Application Priority Data

Mar. 31, 2004    (JP) .............................. 2004-108510

(51) Int. Cl.
*G02B 6/35*    (2006.01)
(52) U.S. Cl. .......................................... 385/18; 385/19
(58) Field of Classification Search ................. 385/18, 385/19, 31, 47, 49; 359/439
See application file for complete search history.

(56) References Cited

U.S. PATENT DOCUMENTS

| | | | |
|---|---|---|---|
| 6,044,705 A | 4/2000 | Neukermans et al. | |
| 6,526,194 B1 * | 2/2003 | Laor | 385/18 |
| 6,741,777 B2 * | 5/2004 | Jewell et al. | 385/49 |
| 6,766,085 B2 * | 7/2004 | Fouquet et al. | 385/52 |
| 6,782,153 B2 * | 8/2004 | Polinsky et al. | 385/16 |
| 6,961,485 B2 * | 11/2005 | Kondo et al. | 385/16 |
| 2002/0126949 A1 * | 9/2002 | Welsh et al. | 385/18 |

FOREIGN PATENT DOCUMENTS

| | | |
|---|---|---|
| JP | 11-86321 | 3/1999 |
| JP | 2003-202418 | 7/2003 |
| WO | WO 00/20899 | 4/2000 |

OTHER PUBLICATIONS

D.T.Neilson, et al., "Fully Provisioned 112×112 Micro-Mechanical Optical Crossconnect with 35.8Tb/s Demonstrated Capacity," *Optical Fiber Communication Conference (OFC 2000)*, Mar. 2000, Post deadline paper PD-12.

* cited by examiner

*Primary Examiner*—Michelle R. Connelly-Cushwa
(74) *Attorney, Agent, or Firm*—Staas & Halsey LLP

(57) ABSTRACT

A micromirror element is configured such that a mirror body is arranged via a support on a wiring substrate on which a pair of mirror drive electrodes and a light detection unit are arranged. A mirror is constituted of a mirror frame and a movable mirror swayably supported by the mirror frame. A light transmitting hole is formed at the center of the movable mirror. Light passing through the light transmitting hole is detected by the light detection device.

13 Claims, 10 Drawing Sheets

MICROMIRROR ELEMENT AND OPTICAL SWITCH

CROSS-REFERENCE TO RELATED APPLICATIONS

This application is based upon and claims the benefit of priority from the prior Japanese Patent Application No. 2004-108510, filed on Mar. 31, 2004, the entire contents of which are incorporated herein by reference.

BACKGROUND OF THE INVENTION

1) Field of the Invention

The present invention relates to micro electro mechanical system (MEMS) micromirror, and specifically, to a micromirror element suitable for a large scale channel switching (that is, crossconnect) for wavelength multiplexed optical signals with a large number of wavelength multiplex, and to an optical switch with the use thereof.

2) Description of the Related Art

Recently, a necessity for handling optical signals at an ultra high speed exceeding 10 Gbp per second has been arising in an optical switch function of an optical crossconnect device or the like as a consequence of speedup of optical signals in trunk line system. Moreover, the optical switches are becoming larger in size owing to an increase in number of wavelength multiplex in the transmitting technology of Wavelength Division Multiplex (WDM).

Large scale optical switches with MEMS mirrors have been disclosed in Patent literature 1 and Non-Patent literature 1. Hereinafter, the MEMS mirror used for an optical switch in such a structure is explained.

In the MEMS mirror element, a pair of electrodes arranged on a substrate carry out attraction and separation of a mirror swayably supported above the substrate by an electrostatic force generated between the electrodes. Owing to the electrostatic force, the mirror sways and tilts, thereby allowing adjustment of angles of the reflecting surface of the mirror. Moreover, owing to appropriate adjustment of the angles of the reflection surface of the mirror, it is possible to carry out switching of signal paths of light (for example, see Patent literature 2).

In the MEMS mirror element in such a structure, for example, a pair of electrodes are formed on a substrate by etching, and also a mirror body is constituted of a mirror and a mirror frame that swayable supports the mirror. Moreover, the mirror body is arranged via a support on the substrate on which a pair of electrodes are formed.

In an optical switch provided with such a MEMS mirror element described above, it is required to carry out feedback control using input light and output light for the optical switch to realize a stable operation. In addition, it is also necessary to compare the input light to the output light to judge malfunction inside the switch. Therefore, an arrangement of light detection devices in an input unit and an output unit of light, respectively, in the optical switch is necessary.

FIG. 15 represents a conventional optical switch provided with MEMS mirror elements. As shown in FIG. 15, in an optical switch provided with MEMS mirror arrays for input side 1505 and output side 1506 having a structure in which a plurality of MEMS mirrors 1500 are arranged in a matrix form and integrated, light (input light) 1511 input to an optical fiber array for input side 1503 is detected by a light detection device for input side 1501, and light (output light) 1512 output from an optical fiber array for output side 1504 is detected by a light detection device for output side 1502.

A control device 1507 compares light detection signals 1513 and light detection signals 1514 that are obtained from the input light and the output light detected by the light detection devices for input side 1501 and output side 1502, respectively, and detects malfunction of the optical switch based on the comparison results. Furthermore, feedback control of the optical switch is carried out based on the detection signals for output light 1514. Each of the light detection devices for input side 1501 and output side 1502 makes use of the one that integrates, for example, an optical coupler and an optical monitor.

As to the optical switch having the structure described above, the light detection devices 1501 and 1502 are arranged on the input side and the output side of the optical switch, respectively, which makes the structure of the switch complex, resulting in a significant increase in cost. To solve the problem, a structure shown in FIG. 16 in which light detection devices are integrated on a mirror surface has been offered (for example, see Patent literature 3).

In the MEMS mirror element shown in FIG. 16, a mirror body 1600 is arranged above a substrate (not shown) via a support (not shown). In the mirror body 1600, a light detection layer 1603 is formed on the surface of the mirror substrate (not shown), and a reflecting layer 1604 constituting a mirror surface (reflecting surface) is formed on the surface of the light detection layer 1603 to constitute a movable mirror 1601. The movable mirror 1601 is swayably supported by a first mirror frame 1602 via torsion springs 1605, and the first mirror frame 1602 is further swayably supported by a second mirror frame 1606 via other torsion springs 1605.

In the MEMS mirror element in such a structure, a light current is detected on the light detection layer 1603 of the movable mirror 1601 according to input light, thereby obtaining detection signals of the light incident to the MEMS mirror element. Since the movable mirror 1601 and the light detection layer 1603 are integrally formed in the MEMS mirror element, separate light detection devices are not necessary as in the case of FIG. 15.

Patent literature 1: International Publication WO 00/020899
Patent literature 2: U.S. Pat. No. 6,044,705
Patent literature 3: Japanese Patent Application Laid-Open Publication No. 2003-202418
Non-Patent literature 1: Fully provisioned 112×112 micromechanical opticalcrossconnect with 35.8 Tb/s demonstrated capacity, Optical Fiber Communications Conference (OFC 2000), Postdeadline paper PD-12, March 2000

In the MEMS mirror element of the structure shown in FIG. 16 in which the movable mirror 1601 and the light detection layer 1603 are integrally provided, the yield rate of the movable mirror 1601 and the yield rate of the light detection layer 1603 synergistically affect the yield rate of the MEMS mirror element at the time of fabrication of the element. Accordingly, the yield rate of the whole MEMS mirror element is reduced in such a structure. As the result, reduction in cost becomes difficult.

SUMMARY OF THE INVENTION

It is an object of the present invention to solve at least the problems in the conventional technology.

A micromirror element according to an aspect of the present invention includes a mirror body arranged on a substrate via a support, the mirror body having a frame and a movable mirror swayably supported by the frame, and the mirror body is formed so as to allow part of incident light to pass through the movable mirror; and a light detecting unit that is arranged on the substrate and detects the light having passed through the movable mirror.

An optical switch according to another aspect of the present invention includes an optical fiber array for input side to which light is input; a mirror array for input side that reflects the light output from the optical fiber array for input side; a mirror array for output side that reflects the light output from the mirror array for input side; and a fiber array for output side that outputs the light output from the mirror array for output side; and at least one of the mirror array for input side and the mirror array for output side includes a micromirror element. The micromirror element has a mirror body that is arranged on a substrate via a support to, the mirror body includes a frame and a movable mirror swayably supported by the frame, and mirror body is configured so as to allow the movable mirror to pass part of incident light; and a light detecting unit that detects the light that passes through the movable mirror arranged on the substrate.

The other objects, features, and advantages of the present invention are specifically set forth in or will become apparent from the following detailed description of the invention when read in conjunction with the accompanying drawings.

DETAILED DESCRIPTION

Exemplary embodiments of a micromirror element and an optical switch according to the present invention will be explained in detail with reference to the accompanying drawings. The MEMS technology is applied to this micromirror element.

Figure 1:
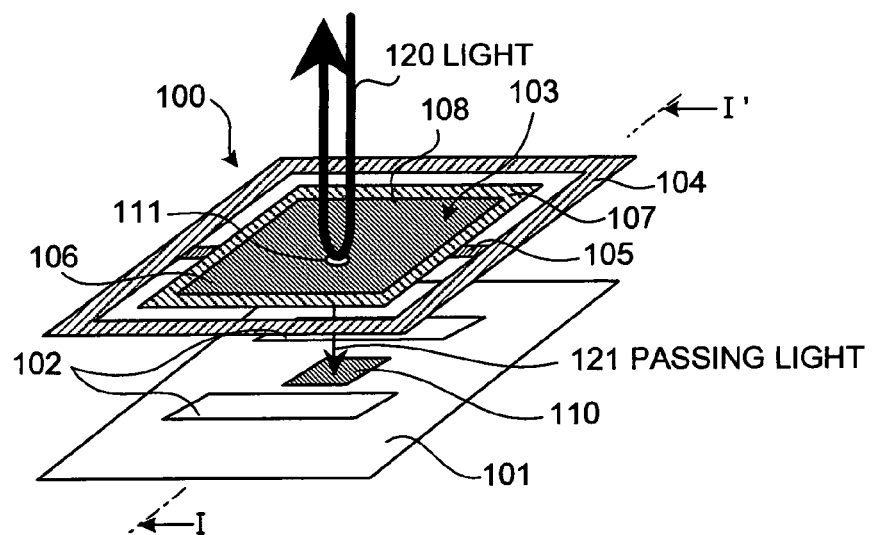
FIG. 1 is a perspective view of a micromirror element according to a first embodiment of the present invention.
Figure 2:
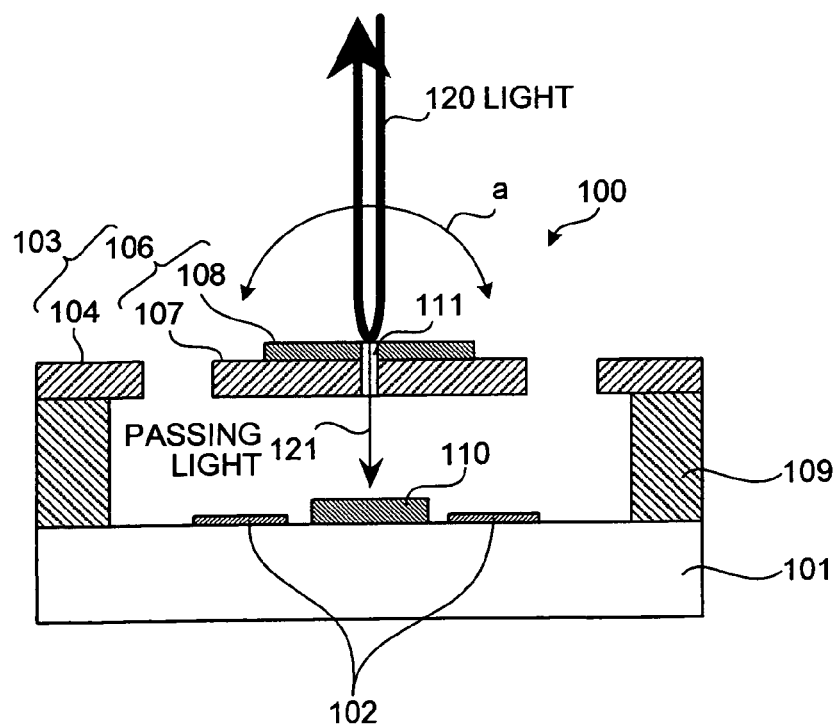
FIG. 2 is a cross section of the micromirror element shown in FIG. 1 along a I-I' line.

FIG. 1 is a perspective view of a micromirror element 100 according to a first embodiment of the present invention. FIG. 2 is a cross section along a I-I' line in FIG. 1.

The micromirror element 100 has a structure in which a mirror body 103 is supported by a support 109 (see FIG. 2) on a wiring substrate 101 where a pair of mirror drive electrodes 102 and a light detection device 110 are arranged. Although not specifically shown, various wiring and circuits are arranged on the wiring substrate 101.

As shown in FIG. 1, the mirror body 103 comprises a mirror frame 104 that is a square frame body and a square movable mirror 106. The movable mirror 106 is swayably supported by the mirror frame 104 via a pair of torsion bars 105 arranged opposite to each other on the edge sides of the movable mirror 106. The mirror frame 104 is mounted and fixed to the edge portion of the support 109 (see FIG. 2).

The movable mirror 106 has a reflecting layer 108, i.e., a reflecting surface, formed on the surface of a mirror substrate 107 as shown in FIG. 2. A silicon (Si) substrate is used as the mirror substrate 107 and a gold (Au) film constitutes the reflecting layer 108.

An electrode for mirror side, whose depiction is omitted, is arranged on the back surface of the mirror substrate 107 with facing to the mirror drive electrodes 102. The mirror substrate itself may also serve as the electrode.

At the center of the movable mirror 106 is formed a light transmitting hole 111, in a circular shape in cross section, passing through the mirror substrate 107, the reflecting layer 108, and the electrode for mirror side (not shown; it may also be sometimes served by the mirror substrate). The diameter of the light transmitting hole 111 is not only determined such that most of light incident to the movable mirror 106 is reflected and only a small portion of it passes through the light transmitting hole 111 but also appropriately determined according to the size of a light receiving unit, its detection characteristic, and the like of a light detection device 110 that is described later. Here, the light transmitting hole 111 is formed to have a uniform diameter in the thickness direction of the movable mirror 106.

At the time of fabrication of the movable mirror 106 in such a structure, first, the square mirror substrate 107 is formed by etching a Si substrate with the use of the reactive ion etching (RIE) method or the like, followed by arranging a mask that has a circular opening (not shown) at the center on the surface of the formed mirror substrate 107. The mask should be arranged such that the opening is positioned at the center of the mirror substrate 107 at this time. Then, etching is carried out by the RIE method or the like with the use of the mask to remove the mirror substrate 107 in the opening of the mask, thereby forming the circular light transmitting hole 111 at the center of the movable mirror 106.

Next, the reflecting layer 108 made of an Au film is formed on the surface of the mirror substrate 107 by the vapor deposition method or the like to have a predetermined thickness.

On the other hand, in the region of the wiring substrate 101 placed below the light transmitting hole 111 is arranged the light detection device 110. Here, the light detection device 110 is constituted of a light receiving element such as photodiode, metal-semiconductor metal (MSM). The center of the light receiving unit of the light detection device 110 and the center of the light transmitting hole 111 are in accord with each other. Since the light transmitting hole 111 is provided in the center portion of the movable mirror 106 as described above, a structure in which the center of the light receiving unit of the light detection device 110 and the center of the movable mirror 106 correspond with each other can be realized. Therefore, as described later, such a structure produces a maximum light current detected at the light receiving unit when the center of the movable mirror 106 and the center of light incident to the movable mirror 106 correspond with each other.

The light detection device 110 that is prefabricated in a separate process may be attached to the wiring substrate 101 or the light detection device 110 may be directly fabricated on the wiring substrate 101. When it is directly fabricated, the number of fabrication processes of the micromirror element 100 can be significantly reduced.

In the miromirror element 100 that has the above structure, when a voltage is applied between the mirror drive electrodes 102 and the electrode for mirror side (not shown), an electrostatic force is generated between these electrodes. The mirror drive electrodes 102 perform attraction and separation of the movable mirror 106 with the electrostatic force. This allows the movable mirror 106 to sway around the axis of the torsion bar 105 in directions of the two axes as shown by an arrow A in FIG. 2. As the result, the movable mirror 106 tilts toward the predetermined angle, thereby biasing the reflecting surface of the mirror.

Figure 3:
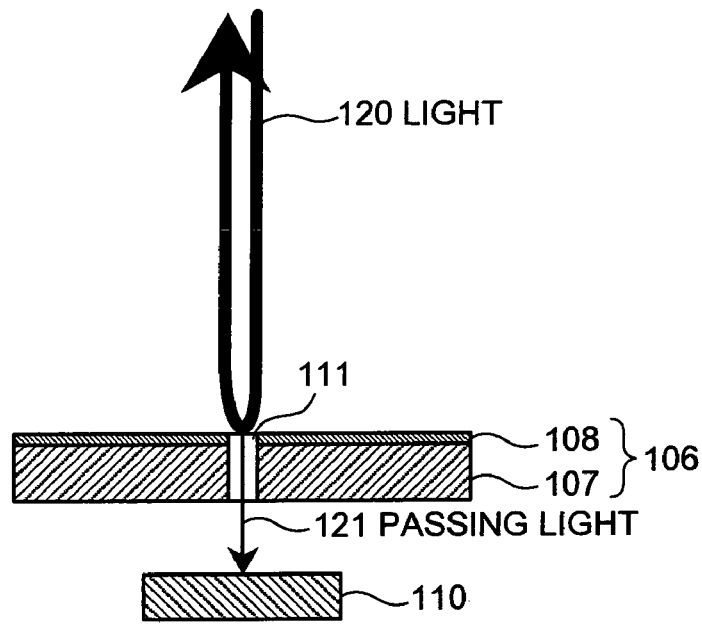
FIG. 3 represents an action of light detection in the micromirror element of FIG. 1.

Next, a detection method for light in the micromirror element 100 is explained. FIG. 3 represents an action of light detection in the micromirror element 100.

As shown in FIG. 3, when light 120 enters the reflecting surface (i.e., the surface of the reflecting layer 108) of the movable mirror 106 of the micromirror element 100, most of the light 120 is reflected from the reflecting surface, while part of the light passes the movable mirror 106 through the light transmitting hole 111 (i.e., corresponding to passing light 121), thereby irradiating the light receiving unit of the light detection device 110 arranged below the movable mirror 106.

The light 121 received by the light receiving unit of the light detection device 110 is detected as a light current, converted to optical-electrical signals, and output to a signal processing circuit (not shown) as detection signals of the light 120. As described later for FIGS. 13 and 14, detection signals 1312, 1313, 1413, and 1414 of the light 120 obtained by the light detection devices 110 of the micromirror elements 100 are output to control devices 1305 and 1404 in an optical switch constituted of the micromirror elements 100. The control devices 1305 and 1404 carry out feedback control, detection of malfunction, and the like based on the detection signals 1312, 1313, 1413, and 1414.

As described hereinbefore, in the micromirror element of the present embodiment in which part of light incident to the movable mirror 106 irradiates, through the light transmitting hole 111, the light detection device 110 that is mounted on the wiring substrate 101 (see FIG. 2), the light detection device 110 is arranged within the element. Therefore, it is not necessary to provide the light detection device 110 as a separate light detection device from the micromirror element 100.

Figure 16:
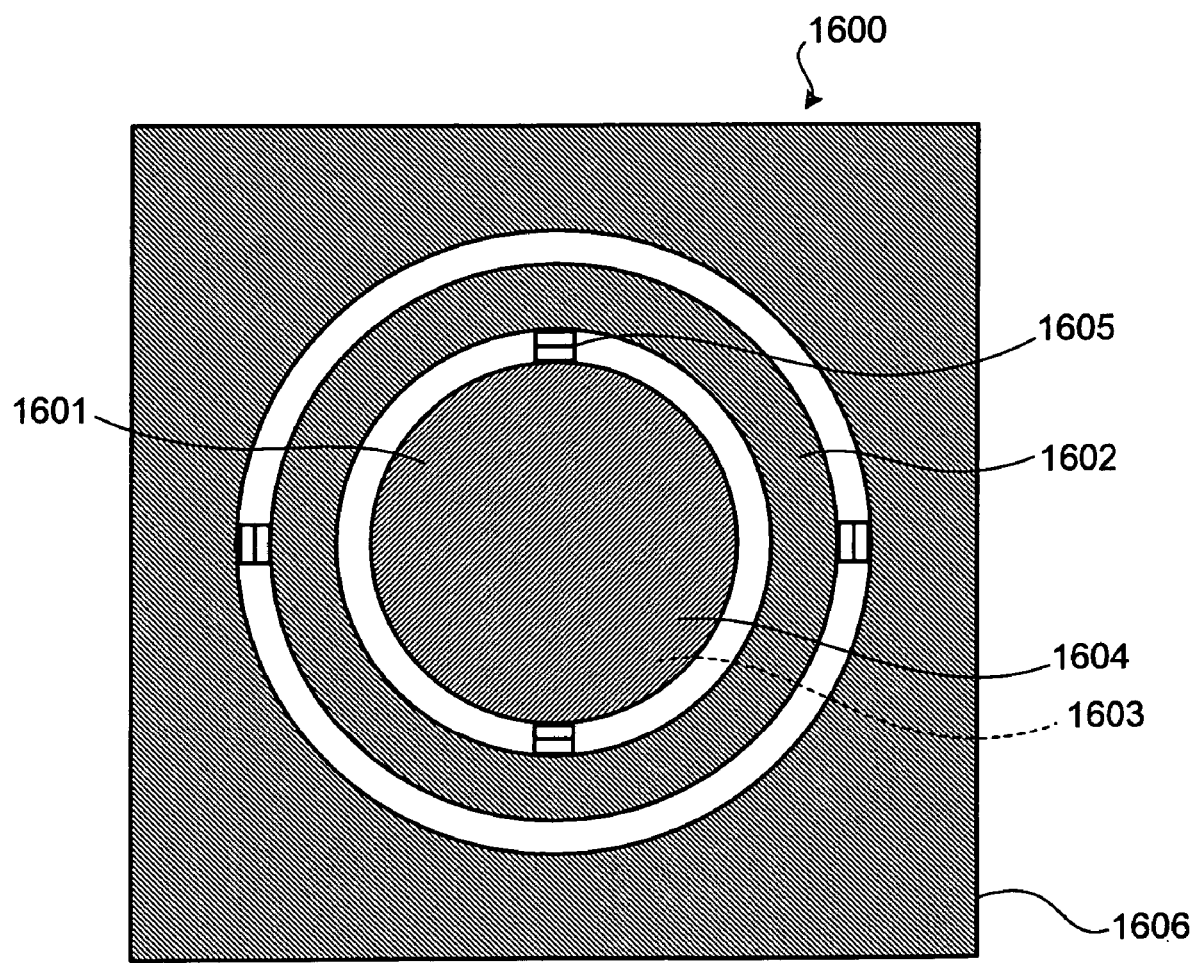
FIG. 16 represents another structure of a conventional optical switch.

In the micromirror element 100 of the present embodiment, the movable mirror 106 and the light detection device 110 are not integrated like a conventional example as shown in FIG. 16, and fabricated in separate processes. Therefore, the defect rates of the movable mirror 106 and the light detection device 110 do not synergistically affect the defect rate of the micromirror element 100. This leads to improvement in the yield rate of the whole micromirror element 100. Owing to the above, reduction in cost can be achieved with the micromirror element 100 of the present embodiment.

In the micromirror element 100, the center of the movable mirror 106 and the center of the light detection device 110 correspond with each other. Therefore, when the light 120 irradiates the center of the movable mirror 106, a light current detected by the light detection device 110 becomes maximum. Taking advantage of this fact, the movable mirror 106 is swayed such that the light current detected by the light detection device 110 becomes maximum, and the angle of the reflecting surface is adjusted, whereby it becomes possible for the light 120 to irradiate the center of the movable mirror 106. As described above, alignment of the center of the movable mirror 106 and the beam spot of the incident light 120 can be achieved easily and accurately.

The case in which the light transmitting hole 111 has an uniform diameter in the thickness direction of the movable mirror 106 has been explained above. On the other hand, a structure where the diameter of the light transmitting hole 111 varies in the thickness direction of the movable mirror 106, that is, a structure where a side wall of the light transmitting hole 111 is tilted may be employed as a modification example of the present embodiment. Hereinafter, such a structure is explained.

Figure 4:
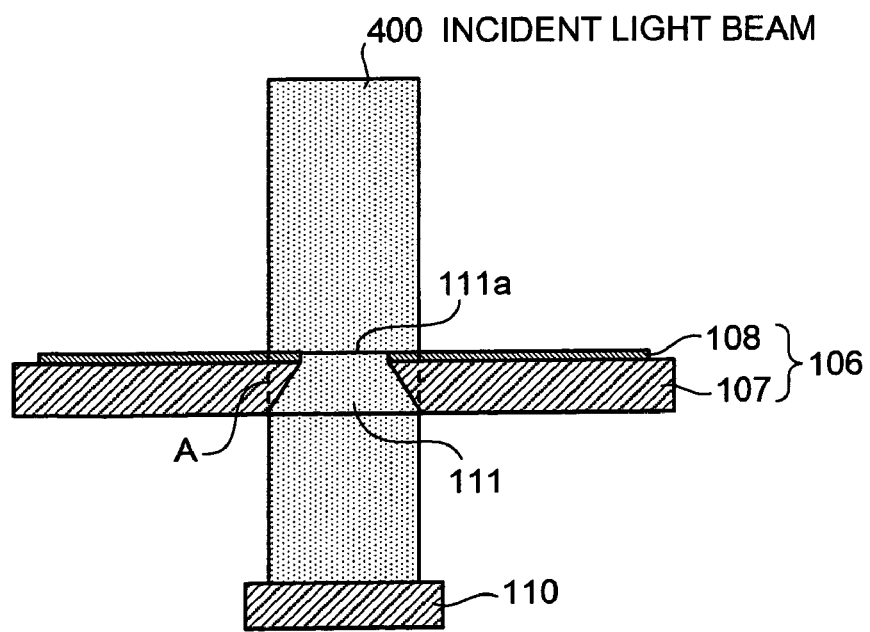
FIG. 4 is one explanatory drawing of a shape of a light transmitting hole and its effect in a modification example of the first embodiment.
Figure 5:
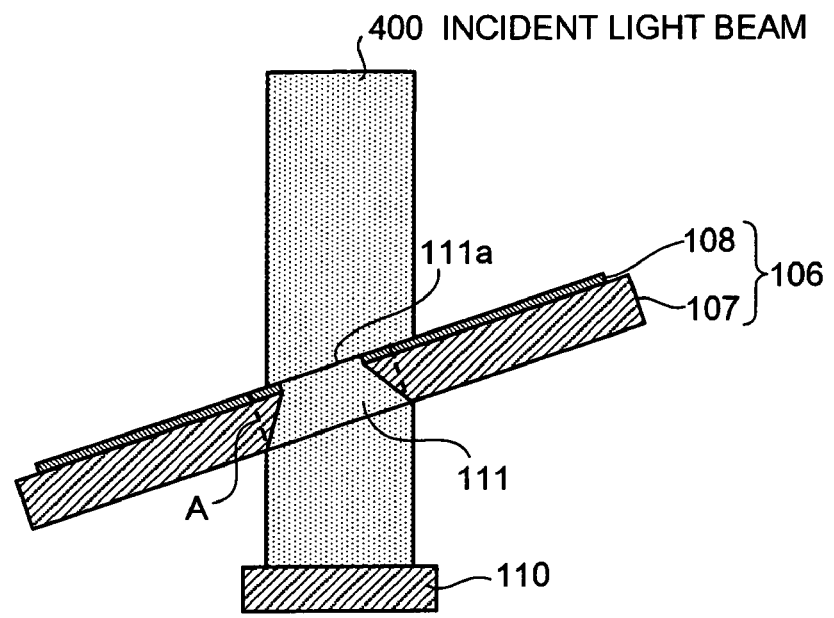
FIG. 5 is another explanatory drawing of the shape of the light transmitting hole and its effect in the modification example of the first embodiment.

FIGS. 4 and 5 are explanatory drawings of a shape of a light transmitting hole of the micromirror element and its effect according to a modification example of the first embodiment. The configurations other than the movable mirror 106 and the light detection device 110 according to the present example are the same as those shown in FIGS. 1 and 2, and their depictions are omitted here. Furthermore, only a light bundle 400 (hereinafter, referred to as incident light beam) that passes through the light transmitting hole 111 among the light irradiating the movable mirror 106 is depicted here and other light bundles reflected from the mirror surface are not shown.

As shown in FIGS. 4 and 5, the light transmitting hole 111 formed in the movable mirror 106 of the present embodiment has a tapered shape in cross section, which becomes gradually wider from the reflecting surface side to the back surface side. In other word, the light transmitting hole 111 is formed in a conical trapezoidal shape here.

Effects of the light transmitting hole 111 formed in such a shape are explained next. The effects of the present example here are explained with comparison to the case in which the light transmitting hole 111 is formed to have a uniform diameter as described above (that is the case in which the light transmitting hole 111 is formed in a shape shown by the broken line A in FIGS. 4 and 5).

First, a case in which the cross sectional area does not vary in the thickness direction of the movable mirror 106 as shown by the broken line A in FIGS. 4 and 5, that is, the light transmitting hole 111 is formed to have a uniform diameter is explained. In this case, when an incident light beam 400 perpendicularly enters the movable mirror 106 that is horizontally retained as shown in FIG. 4, the incident light beam 400 passes through the hole without being shielded by the area of the movable mirror 106 other than the light transmitting hole 111 and is detected by the light detection device 110.

Thus, in this case, the incident light beam 400 enters the hole with utilizing the whole area of a light inlet 111A of the light transmitting hole 111 effectively. In other word, the area of the light inlet 111A effective for passing of the incident light beam 400 is maximum.

On the other hand, when the arrangement of the movable mirror 106 is tilted as shown by the broken line A in FIG. 5, which changes the relative position of the incident light beam 400 to the movable mirror 106, the incident light beam 400 that irradiates the area other than the light transmitting hole 111 is shielded by the movable mirror 106. In this case, the incident light beam 400 enters the hole not from the whole area of the light inlet 111A of the light transmitting hole 111 but from the predetermined portion of the light inlet 111A. The area of the light inlet 111A effective for passing of the incident light beam 400 becomes smaller in this case compared to the case in FIG. 4.

In the case where the light transmitting hole 111 has a uniform diameter as described above, when the relative position of the movable mirror 106 to the incident light beam 400 varies owing to tilting of the movable mirror 106, the area of the light inlet 111A effective for passing of the incident light beam 400 varies.

On the other hand, in the following present example, a structure in which the area of the light inlet 111A effective for passing of the incident light beam 400 does not vary even if the relative position of the movable mirror 106 to the incident light beam 400 varies is realized.

That is, in the present example in which the cross sectional area of the light inlet 111A of the light transmitting hole 111 in a tapered shape smaller than that of the light outlet (shown by solid line), the area of the light inlet 111A effective for passing of the incident light beam 400 is kept constant in a state where the movable mirror 106 is arranged perpendicularly to the incident light beam 400 as shown in FIG. 4, and in a state where the movable mirror 106 is arranged so as to be tilted with respect to the incident light beam 400 as shown in FIG. 5. Therefore, the effect due to variation of the relative position of the movable mirror 106 to the incident light beam 400 can be lessened at the time of detection of incident light beam 400 by the light detection device 110.

The above example has been explained for the case where the light transmitting hole 111 has a conical trapezoidal shape. As long as the shape of the light transmitting hole 111 can retain a constant area of the light inlet 111A effective for passing of incident light beam even if the movable mirror 106 is tilted, the light transmitting hole 111 may be in any shape other than a conical trapezoidal shape.

Figure 6:
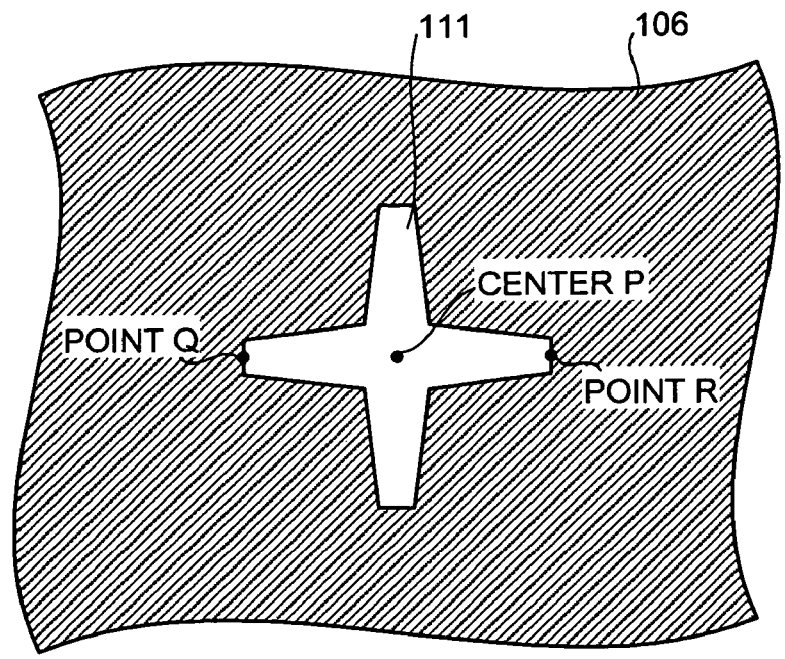
FIG. 6 is a top plan view of a light transmitting hole formed in a movable mirror of a micromirror element according to a second embodiment of the present invention.

FIG. 6 is a top plan view of a light transmitting hole formed in a movable mirror of a micromirror element according to a second embodiment of the present invention. Although only the light transmitting hole 111 of the movable mirror 106 is shown here, the other configurations whose depictions are omitted are the same as those of the first embodiment.

As shown in FIG. 6, the light transmitting hole 111 that has a shape of a cross is formed at the center of the movable mirror 106 of the micromirror element of the present embodiment. The center P of the light transmitting hole 111 corresponds with the center of the movable mirror 106. The opening area of the light transmitting hole 111 becomes smaller along the directions from the center P to the point Q and to the point R of the hole, respectively. The change of opening area in each direction to the point Q or the point R is symmetrical to each other with respect to the center P.

Figure 7:
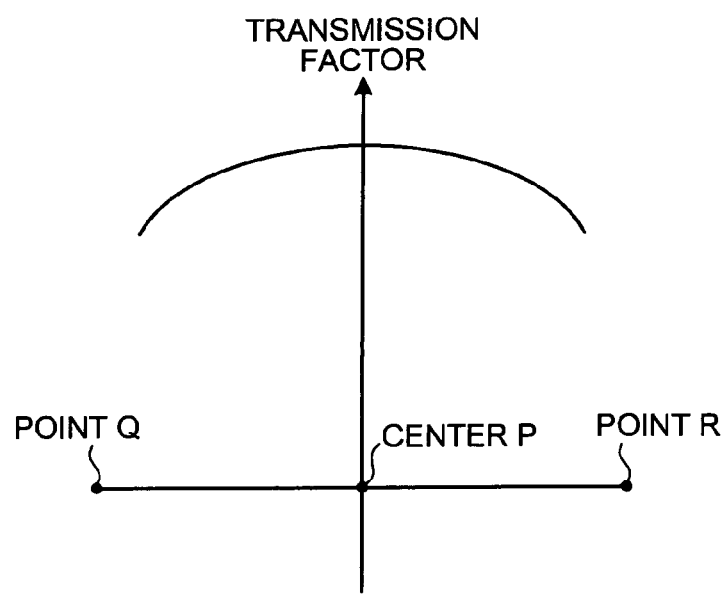
FIG. 7 represents the distribution of the light transmission factor in the light transmitting hole.

Accordingly, a light transmission factor in the light transmitting hole 111 becomes maximum at the center P of the hole and decreases toward the points Q and R at the respective leading ends of the hole in the distribution as shown in FIG. 7. In FIG. 7, the vertical axis represents the light transmission factor in the light transmitting hole 111 and the horizontal axis represents the relative position of the point Q to the point R with respect to the center P in the light transmitting hole 111.

Figure 8:
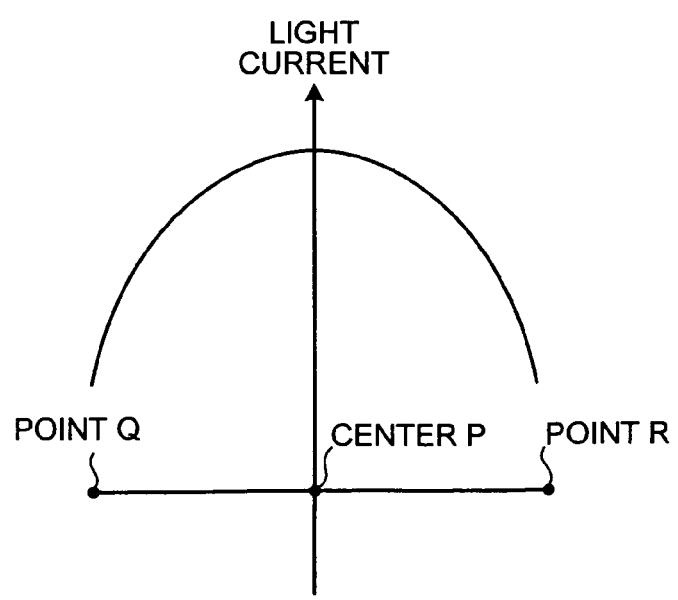
FIG. 8 represents the distribution of the light current of the light having passed through the light transmitting hole, followed by being received by a light detection device.

In general, an intensity of beam of light that propagates space becomes lower toward the outer periphery of the beam from the center thereof and shows a Gaussian function-type distribution. Therefore, when light enters the movable mirror 106 (see FIG. 6) under the state that the distribution of the light transmission factor in the light transmitting hole 111 becomes lower toward the points Q and R of each leading end from the center P as shown in FIG. 7, the light current that is detected by the light detection device 110 (see FIG. 2) becomes maximum as shown in FIG. 8 when the center of the beam with an highest intensity corresponds with the center P of the light transmitting hole 111 that has a highest light transmission factor. Furthermore, when the center of the beam is displaced from the center P to the side of the point Q or the point R, the light current to be detected decreases significantly. FIG. 8 represents the magnitude of the current detected by the light detection device 110 (see FIG. 2). The horizontal axis represents the relative position of the point Q to the point R with respect to the center P in the light transmitting hole 111.

Considering such a relation between the center position of the beam and the light current to be detected, inclination of the movable mirror 106 (see FIG. 6) is adjusted so as to make the light current detected by the light detection device 110 (see FIG. 2) maximum, which makes it possible to accord the center of the beam to the center portion of the movable mirror 106. In this case, since the deterioration of the light current is significant when the center of the beam is displaced from the center of the movable mirror 106 as shown in FIG. 8, it is possible to adjust the position of the center of the beam more easily and accurately than in the case of the first embodiment.

An effect similar to that of the first embodiment is produced in the structure of the present embodiment as well.

The case in which the light transmitting hole 111 has a shape of a cross is explained above. On the other hand, the shape of the light transmitting hole 111 according to the present embodiment is not limited to the above and may have any shape other than the above as long as the light transmission factor becomes smaller toward the outer periphery from the center portion.

Figure 9:
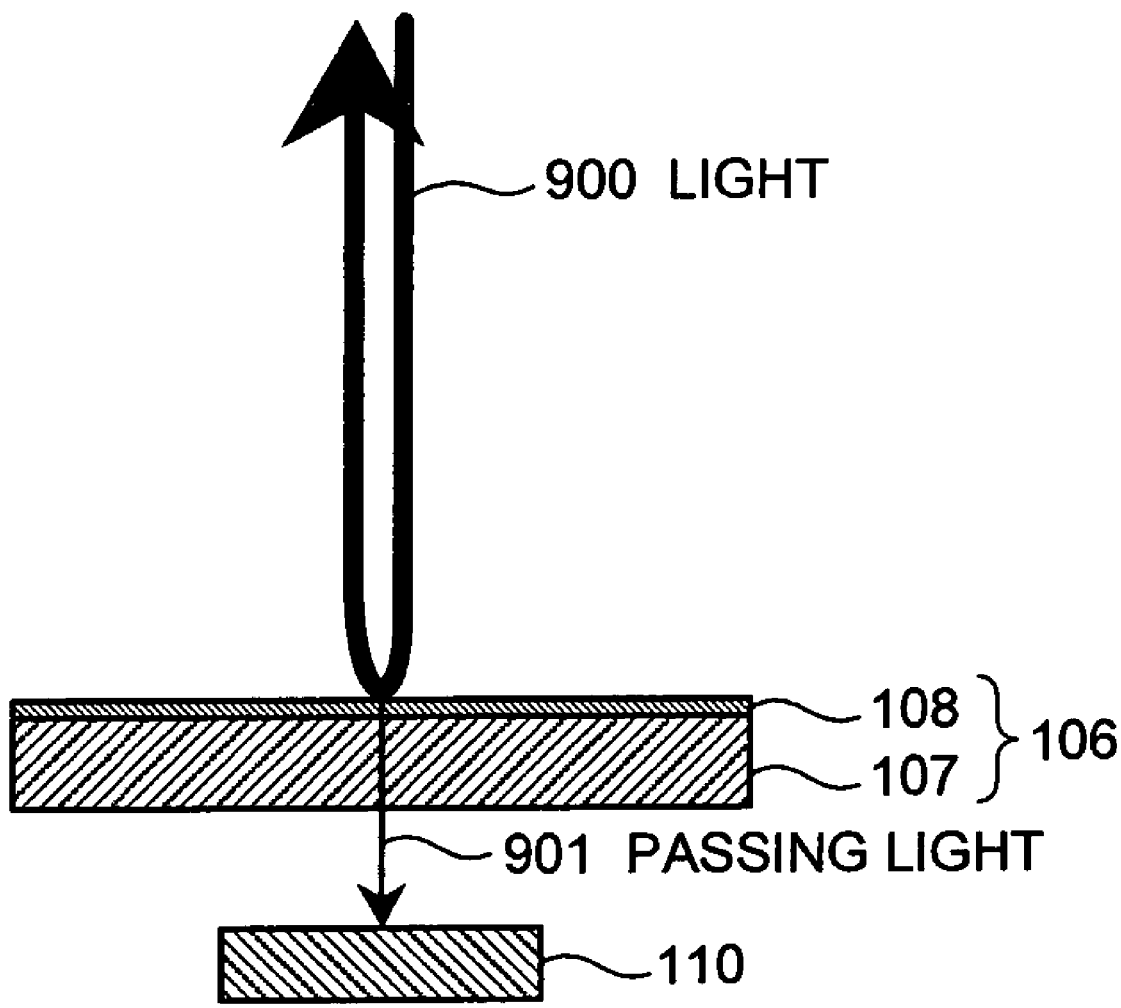
FIG. 9 represents a light detection action in a micromirror element according to a third embodiment of the present invention.

FIG. 9 represents a light detection action in a micromirror element according to a third embodiment of the present invention. Although only the movable mirror 106 and the light detection device 110 are shown in FIG. 9, the configurations whose depictions are omitted other than the above are the same as those of the first embodiment.

As shown in FIG. 9, the movable mirror 106 is configured so as to be capable of reflecting most of irradiating light 900 and transmitting part of the irradiating light 900 in the micromirror element of the present embodiment, that is, the movable mirror 106 is configured to be a half mirror. The movable mirror 106 that is a half mirror configured as described above is realized by adjusting the thicknesses of the mirror substrate 107, the reflecting layer 108, and the electrode for mirror side (not shown).

Here, the Si substrate constituting the mirror substrate 107 is capable of being penetrated by a light band of 1.3 to 1.5 μm that is utilized for optical communications. Moreover, since the electrode for mirror side (not shown) is constituted of a transparent electrode material, making of a half-mirror can be realized by adjusting the thickness of the Au film constituting the reflecting layer 108. The thickness of the Au film for making the half-mirror is appropriately determined according to an appropriate ratio between reflecting light and passing light 901, a size of the light detection device 110, its detection characteristic, and the like, similarly to the determination of the diameter of the light transmitting hole 111 of the first embodiment.

In the micromirror element having such a structure, most of the light 900 irradiates the movable mirror 106 is reflected by the mirror surface, and part of the light penetrates the reflecting layer 108, the mirror substrate 107, and the electrode for mirror side (not shown) of the movable mirror 106 in succession, and then irradiates the light receiving unit of the light detection device 110 (i.e., corresponding to passing light 901). Accordingly, an effect similar to that of the first embodiment can be produced in the present embodiment as well.

Furthermore, according to the present embodiment, a penetrating portion of light can be formed by adjusting the thickness of the Au film constituting the reflecting layer 108 without etching as described in the first embodiment, which leads to an easy fabrication.

The present embodiment can also be applied for the cases where the mirror substrate 107 is constituted of a material other than a Si substrate and where the reflecting layer 108 is constituted of a metal thin film other than an Au film.

Figure 10:
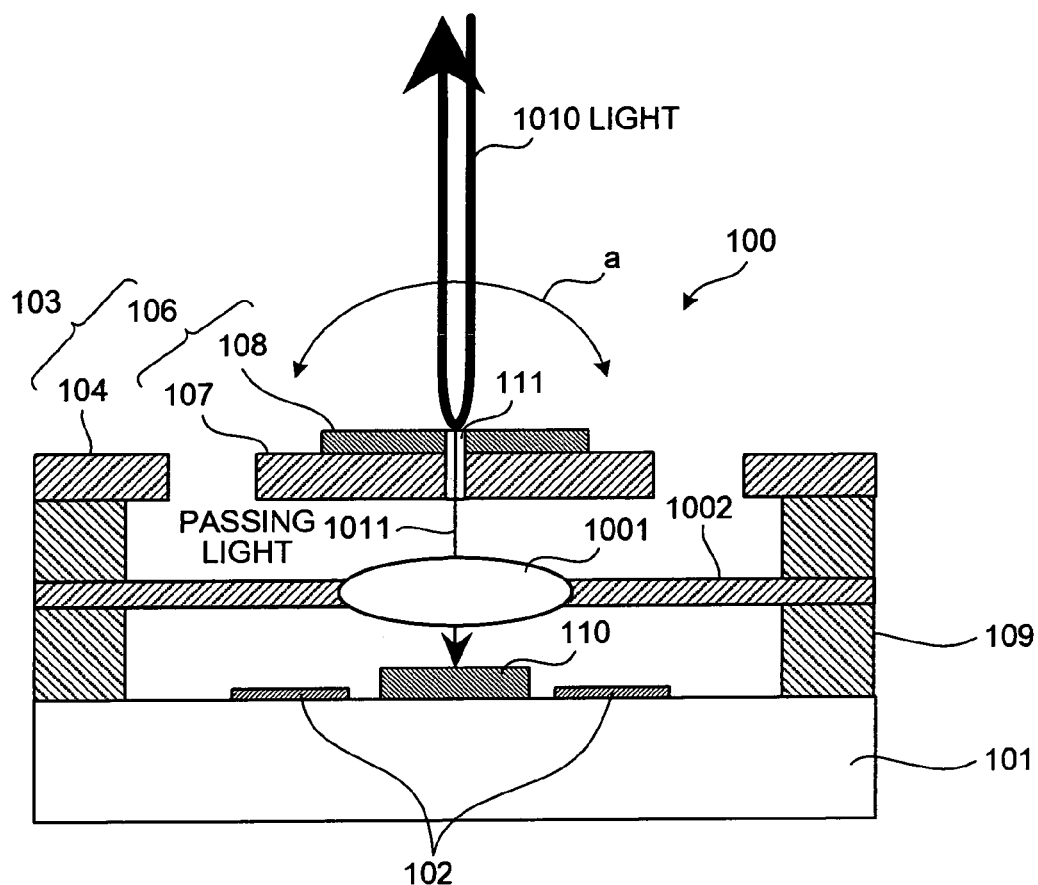
FIG. 10 is a cross sectional view of a micromirror element according to a fourth embodiment of the present invention.

FIG. 10 is a cross sectional view of a micromirror element according to a fourth embodiment of the present invention. As shown in FIG. 10, a structure in which the micromirror element 100 of the present embodiment is provided with a lens 1001 arranged between the mirror body 103 and the light detection device 110 as a condenser is different from the first embodiment. The configurations other than the above are the same as those in the first embodiment. Therefore, their explanations are omitted here.

According to the present embodiment, the convex lens 1001 supported by a lens supporting body 1002 is arranged between the movable mirror 106 and the light detection device 110. The lens 1001 is embedded in and integrated with the board-shaped support 1002, and the edge portions of the lens supporting body 1002 are supported by the support 109. The lens 1001 is arranged such that the light having passed through the light transmitting hole 111 and entered the lens 1001 can be condensed to the light receiving unit of the light detection device 110.

Of light 1010 incident to the movable mirror 106, light (i.e., passing light 1011) incident to the lens 1001 that passes through the light transmitting hole 111 can be condensed to the light receiving unit of the light detection device 110 in such a structure of the present embodiment. Therefore, it is possible for the passing light 1011 to selectively irradiate the light receiving unit of the light detection device 110. This makes it possible to effectively provide the passing light 1011 having passed through the movable mirror 106 to the light detection device 110 for its light detection. As the result, an effect similar to that of the first embodiment can be produced and an improvement in accurate detection as well as making the light detection device 110 small can be achieved.

The case where the basic configurations of the movable mirror 106 and the like are the same as those of the first embodiment is explained above. The configuration of the present embodiment in which the arrangement of the lens 1001 is characteristic can be applied for structures other than that of the first embodiment.

Figure 11:
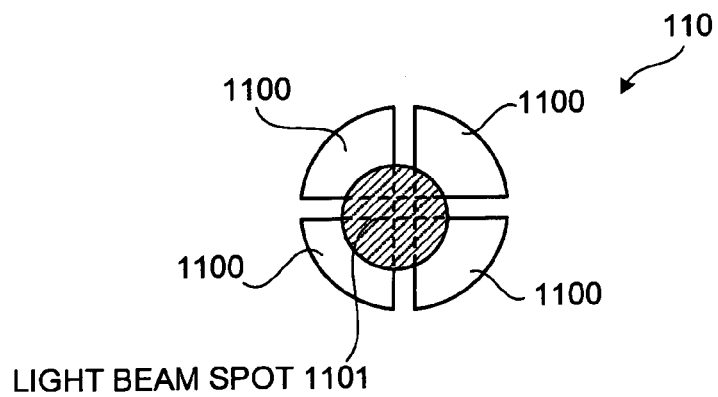
FIG. 11 represents a configuration of a light receiving unit of a light detection device of a micromirror element according to a fifth embodiment of the present invention.

FIG. 11 represents a configuration of a light receiving unit of a light detection device of a micromirror element according to a fifth embodiment of the present invention. Although only the light receiving unit of the light detection device 110 is shown in FIG. 11, any configuration of the first to the fourth embodiments can be applied to the present embodiment besides the above configuration.

According to the present embodiment, the light receiving unit of the light detection device 110 is divided into 4 regions 1100. When the light having passed through the light transmitting hole 111 (see FIG. 2) irradiates each region 1100 of the light receiving unit of the light detection device 110, each light is received by each region 1100, respectively, and each light current is detected.

Here, the amount of light that irradiates each region 1100 of the light receiving unit of the light detection device 110 varies in association with position changes of a light beam spot 1101. For example, when the center of the light beam spot 1101 corresponds with the center of the light receiving unit, the amounts of light irradiates each region 1100 of the light receiving unit become uniform, which leads to a uniform light current detected by each region 1100. On the other hand, when the position of the light beam spot 1101 is displaced to any one of the regions 1101, the amounts of light irradiates each region 1101 do not become uniform. Therefore, the light currents detected in each region 1101 become different from one another.

Considering the relation between the position of the light beam spot 1011 and the light current detected in each region 1100 of the light receiving unit of the light detection device 110, it is possible to detect the position of the light beam spot 1101 in the light receiving unit of the light detection device 110 by comparing the light currents detected in each region 1100 of the light receiving unit of the light detection device 110 in the present embodiment. This allows detection of the position of the light beam spot irradiated on the movable mirror 106 (see FIG. 2). As the result, the angle of the movable mirror 106 can be adjusted such that the light irradiates the center of the movable mirror 106.

Thus, according to the fifth embodiment, not only can the effect described in the first to the fourth embodiments be produced but also a position of the light beam spot irradiated to the movable mirror 106 can be further detected.

The case where the light receiving unit of the light detection device 110 is divided into four regions 1100 is explained above, but the number of divisions of the light receiving unit is not limited to the above.

Figure 12:
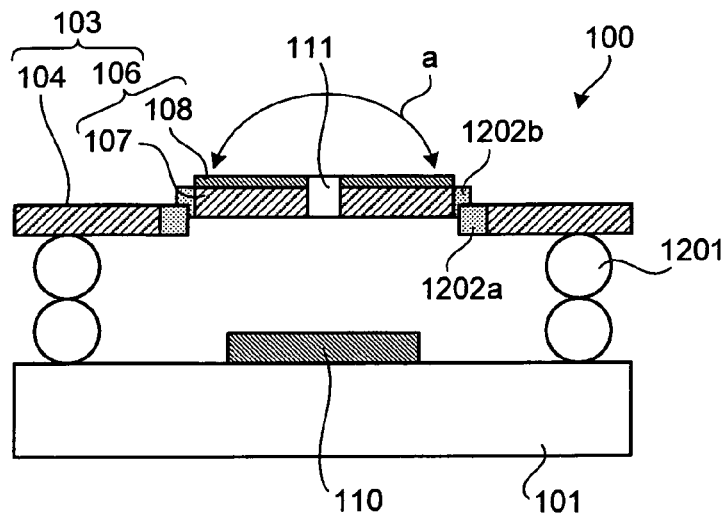
FIG. 12 is a cross sectional view of a micromirror element according to a sixth embodiment of the present invention.

FIG. 12 is a cross sectional view of a micromirror element according to a sixth embodiment of the present invention.

As shown in FIG. 12, the light detection device 110 is mounted on the wiring substrate 101 in the micromirror element 100 of the present embodiment. The mirror body 103 is arranged on the wiring substrate 101 via bumps for connection 1201.

The mirror body 103 is constituted of the mirror frame 104 supported by the bumps for connection 1201 and the movable mirror 106 supported by the mirror frame 104 that is supported swayably by the torsion bars (not shown), similarly to the case of the first embodiment. Although the movable mirror 106 has the same configuration as that of the first embodiment, an electrode for mirror side is not formed on the back surface of the mirror substrate 107, which is different from the first embodiment.

According to the present embodiment, a pair of comb electrodes 1202A are arranged on the inner periphery of the mirror frame 104 so as to be opposite to each other. In addition to that, a pair of comb electrodes 1202B are arranged opposite to each other on the outer periphery of the movable mirror 106 so as to engage the corresponding comb electrodes 1202A of the mirror frame 104. The configurations of the comb electrodes 1202A and 1202B are the same as those in FIG. 5 that have been disclosed in Japanese Patent Application Laid-Open Publication No. 2002-328316.

In the mirror body 103 in such a configuration, an impressed voltage is applied to each of the comb electrodes 1202A of the mirror frame 104 and each of the comb electrodes 1202B of the movable mirror 106, thereby generating an electrostatic force between the electrodes. This electrostatic force sways the movable mirror 106. As the result, the angle of the reflecting surface of the movable mirror 106 is adjusted in the two-axis directions.

According to the present embodiment, an effect similar to that of the first embodiment is produced. Furthermore, the structure of the micromirror element 100 of the present embodiment is suitable for fabrication of the light detection device 110 directly on the wiring substrate 101, and for example, when the light detection device 110 is constituted of photodiode, the photodiode can be fabricated by forming a semiconductor layer directly on the wiring substrate 101. By fabricating the light detection device 110 directly on the wiring substrate 101 as described above, the number of fabrication processes can be reduced at the time of fabrication of the micromirror element, thereby achieving reduction in cost.

The case where the basic configuration of the movable mirror 106 is similar to that of the first embodiment is explained above. However, the structure of the present embodiment is not limited to the above, but for example, the configuration of the movable mirror 106 may be a basic configuration similar to that in the second and the third embodiments. Furthermore, a lens may be arranged between the movable mirror 106 and the light detection device 110 as in the fourth embodiment. Moreover, a configuration in which the light receiving unit of the light detection device 110 is divided as in the fifth embodiment may be accepted.

Hereinafter, an optical switch provided with the micromirror element according to the first to the sixth embodiments described above is explained. The miromirror element constituting the optical switch may be any one of the micromirror elements of the first to the sixth embodiments.

Figure 13:
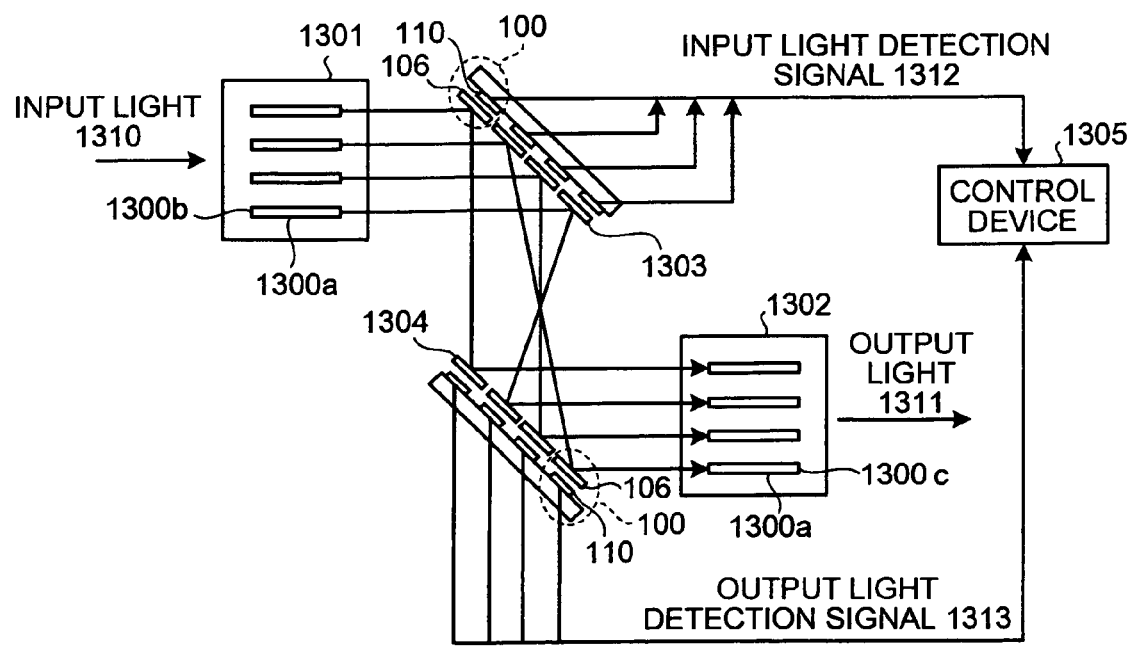
FIG. 13 is a block diagram of an optical switch according to a seventh embodiment of the present invention.

FIG. 13 is a block diagram of an optical switch according to a seventh embodiment of the present invention.

As shown in FIG. 13, the optical switch of the present embodiment is provided with a fiber array for input side 1301 constituted of a plurality of optical fibers 1300A arranged with each one end of the optical fibers 1300A constituting optical input ports 1300B, a mirror array for input side 1303 and a mirror array for output side 1304 both with a plurality of the micormirror elements 100 of the above structure arranged and integrated in a matrix form, a fiber array for output side 1302 constituted of a plurality of optical fibers 1300A arranged with each one end of the optical fibers 1300A constituting optical output ports 1300C, and a control device 1305 to which detection signals of the light detected by each light detection device 110 of each micromirror element 100 constituting the mirror array for input side 1303 and the mirror array for output side 1304 are transmitted to carry out a variety of controls.

The mirror array for input side 1303 and the mirror array for output side 1304 are arranged such that the reflecting surfaces of each movable mirror 106 of each micromirror element 100 face to the corresponding reflecting surfaces, respectively. Furthermore, the fiber array for input side 1301 and the fiber array for output side 1302 are arranged so as to be opposite to each other with interposing the mirror array for input side 1303 and the mirror array for output side 1304 in between.

FIG. 13 is an explanatory drawing of the characteristic structure and an action of the optical switch of the present embodiment and only portions related to them are selected to show. Therefore, the components of the optical switch are not limited to those illustrated. For example, although depictions are omitted here, the optical switch is provided with a collimator lens array and the like similarly to those provided for conventional optical switches.

The number and the arrangement of the micormirror element 100 on the mirror array for input side 1303 and the mirror array for output side 1304, and the number and the arrangement of the optical fibers 1300A on the fiber array for input side 1301 and the fiber array for output side 1302 are not limited to those of the illustrated structure. The micromirror element 100 may be arranged in a plurality of rows and columns in a matrix form on the mirror array for input side 1303 and the mirror array for output side 1304, or may be arranged in one vertical or horizontal row. In addition, for example, a structure in which optical fibers 1300A are arranged in a plurality of rows and columns on the fiber array for input side 1301 and the fiber array for output side 1302 may be accepted.

In the optical switch having such a structure, input light 1310 enters the mirror array for input side 1303 through the fiber array for input side 1301. Then, for example, the input light 1310 is reflected from each of the surfaces of the movable mirrors 106 of each of the micromirror elements 100 constituting the mirror array for input side 1303 and biased as shown in FIG. 2. At this time, part of the light 120 incident to the movable mirror 106 passes through the movable mirror 106 (i.e., corresponding to the passing light 121) and is received by the light receiving unit of the light detection device 110 arranged below the movable mirror 106. The passing light 121 received in such a way is subjected to optical-electrical conversion to be output to the control device 1305 as input light detection signals 1312.

On the other hand, the light biased by the mirror array for input side 1303 next enters the mirror array for output side 1304. Then, similarly to the case of the mirror array for input side 1303, for example as shown in FIG. 2, the light is reflected from each of the surfaces of the movable mirrors 106 of each of the micromirror elements 100 constituting the mirror array for output side 1304 and biased to be led to the fiber array for output side 1302, followed by outputting from the fiber array for output side 1302 as output light 1311.

As shown in FIG. 2, part of the light 120 incident to the movable mirror 106 passes through the movable mirror 106 (i.e., corresponding to the passing light 121) and is received by the light receiving unit of the light detection device 110 arranged below the movable mirror 106 on the mirror array for output side 1304. The passing light 121 received in such a way is subjected to optical-electrical conversion to be output to the control device 1305 as output light detection signals 1313.

The control device 1305 compares each input light detection signal 1312 to each output light detection signal 1313 output from each of the light detection devices 110 of the micromirror elements 100 of the mirror array for input side 1303 and the mirror array for output side 1304, respectively. Based on the comparison results, the control device 1305 carries out feedback control, detection of malfunction, and the like.

For example, when the mirror array for input side 1303 and the mirror array for output side 1304 are constituted of the micromirror elements 100 in which each of the light receiving units of the light detection devices 110 is divided into four regions 1100 as in the fifth embodiment shown in FIG. 11, the control device 1305 detects a position of beam spot of the light that irradiates the surface of the movable mirror 106 based on each detection signal obtained in each of the regions 1100 of the light receiving unit of each light detection device 110 as described above.

When the control device 1305 recognizes that the beam spot of the light detected is displaced from the center of the movable mirror 106, the control device 1305 adjusts arrangements (specifically, an angle of the reflecting surface) of each of the movable mirrors 106 of each micromirror element 100 of the mirror array for input side 1303 and mirror array for output side 1304, respectively, such that the beam spot of the light corresponds with the center of the movable mirror 106, thereby carrying out feedback control.

Moreover, for example, the control device 1305 compares the detection signals 1312 of the input light output from the light detection devices 110 of the micromirror elements 100 of the mirror array for input side 1303 to the detection signals 1313 of the output light output from the detection devices 110 of the micromirror elements 100 of the mirror array for output side 1304. And when the intensity of the detection signals 1313 of the output light is significantly lower than that of the detection signals 1312 of the input light, the control device 1305 recognizes that malfunction has occurred inside the optical switch, thereby detecting malfunction inside the optical switch.

Figure 15:
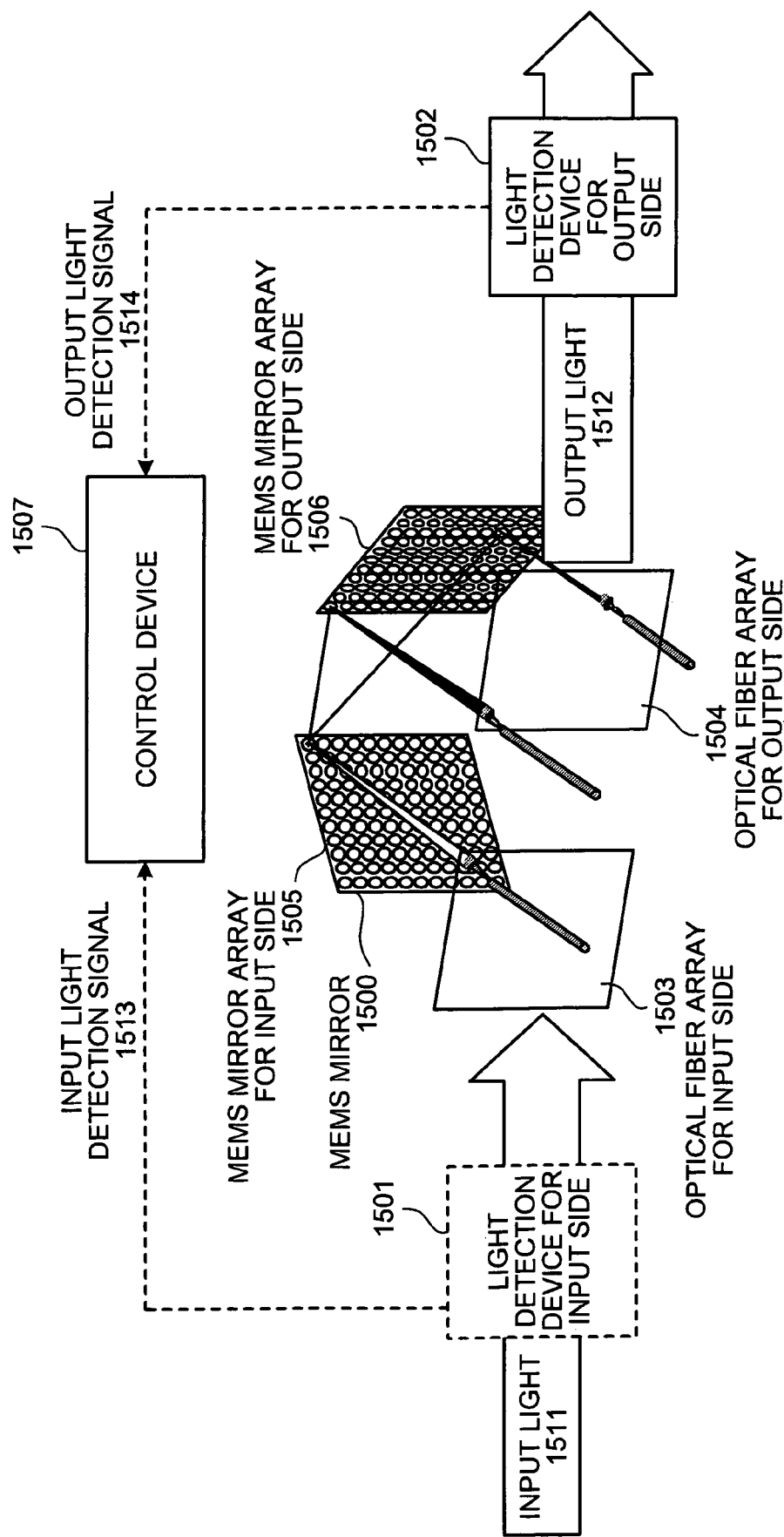
FIG. 15 is a block diagram of one structure of a conventional optical switch.

The optical switch in such a structure of the present embodiment makes it possible that input light of the optical switch is detected by the light detection devices 110 of the mirror array for input side 1303 and that output light of the optical switch is detected by the light detection devices 110 of the mirror array for output side 1304 because the micromirror elements 100 constituting the mirror array for input side 1303 and the mirror array for output side 1304 are provided with the light detection devices 110. Therefore, it is not necessary to provide detection devices for input light and output light independently as in the case of the conventional optical switch shown in FIG. 15. This allows an optical switch to be realized with achievement of reduction in cost.

In addition to the above, the light detection device 110 and the movable mirror 106 of the micromirror element 100 are fabricated in separate processes. This means that the defect rate of the micromirror element 100 is not product of multiplication of the defect rates of the light detection device 110 and the movable mirror 106 as in the case of the conventional micormirror element shown in FIG. 16. Therefore, the yield rate of the micromirror element 100 is improved, resulting in the realization of an optical switch with achievement of reduction in cost.

Figure 14:
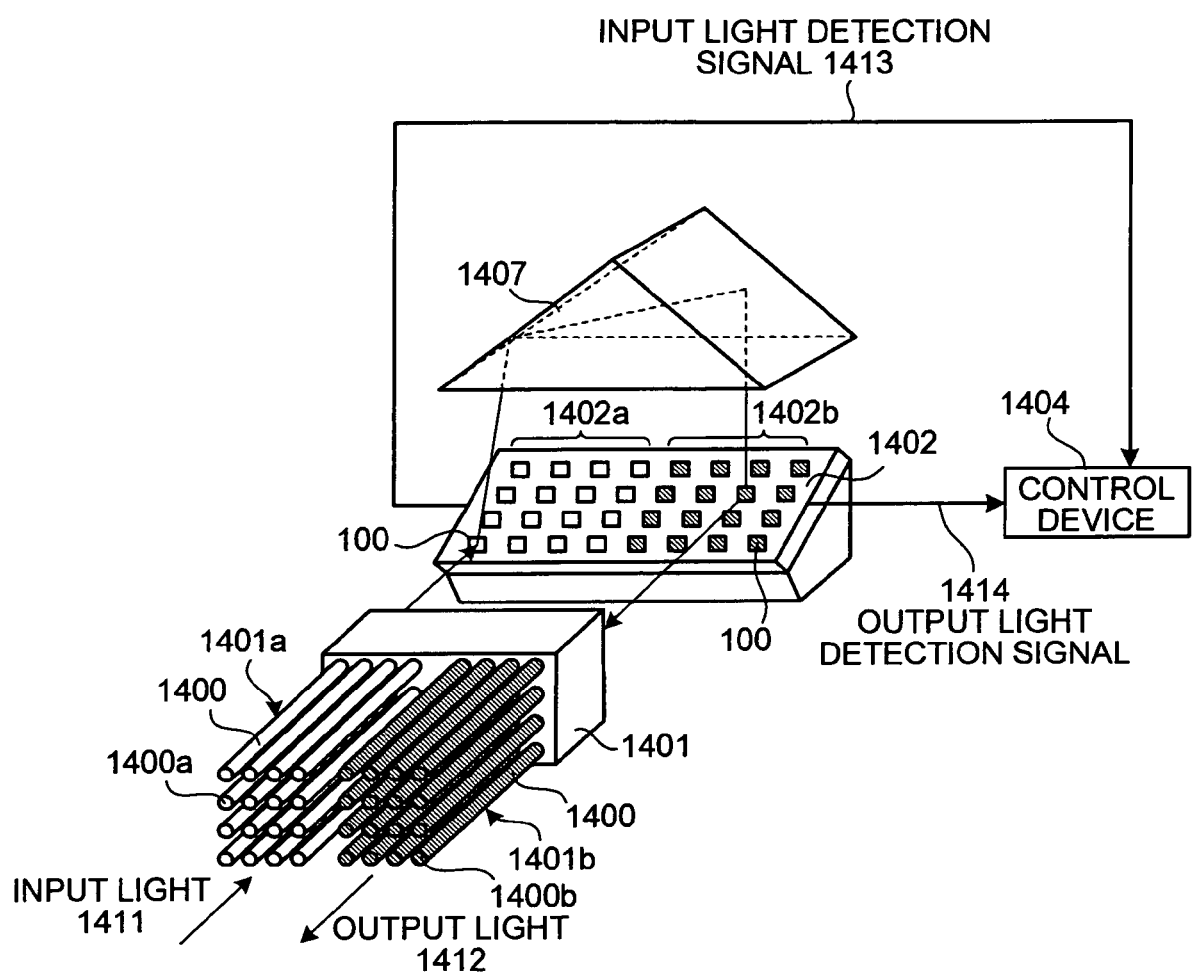
FIG. 14 is a schematic of an optical switch according to an eighth embodiment of the present invention.

FIG. 14 represents an optical switch according to an eighth embodiment of the present invention.

As shown in FIG. 14, the optical switch of the present embodiment is provided with a fiber array for input side 1401A constituted of a plurality of optical fibers 1400 arranged with each one end of the optical fibers 1400 constituting optical input ports 1400A, a fiber array for output side 1401B constituted of a plurality of optical fibers 1400 arranged with each one end of the optical fibers 1400 constituting output ports 1400B, a mirror array 1402 constituted of the micromirror elements 100, having any one of the above structures of the first to the sixth embodiments, arranged in a plurality of rows in a matrix form, a corner mirror 1407 in a triangular prism form arranged above the mirror array 1402, and a control device 1404 to which detection signals of the light detected by each light detection device (not shown) of each micromirror element 100 of the mirror array 1402 are transmitted to carry out a variety of controls.

The fiber array for input side 1401A and fiber array for output side 1401B are arranged adjacently to each other and constitute a fiber block 1401. As is described, input and output of light are carried out on the same side with respect to the mirror array 1402 according to the present embodiment.

Moreover, in the mirror array 1402 of the present embodiment, the micromirror elements 100 arranged on the side of the fiber array for input side 1401A constitute the mirror array for input side 1402A, and the micromirror elements 100 arranged on the side of the fiber array for output side 1401B constitute the mirror array for output side 1402B. As described above, the mirror array 1402 has a structure in which the mirror array for input side 1402A and the mirror array for output side 1402B are arranged on the same plane. The depiction of the detailed structure of the micromirror element 100 is omitted.

FIG. 14 is an explanatory drawing of the characteristic structure and the action of the optical switch of the present embodiment, and only portions related to the above are selectively shown. Therefore, the components of the optical switch are not limited to the ones depicted in FIG. 14. For example, although depictions are omitted here, the optical switch is provided with a collimator lens array and the like similarly to conventional optical switches, and a support of a corner mirror and the like are also provided to the optical switch.

Furthermore, the number and the arrangement of the micromirror elements 100 on the mirror array for input side 1402A and the mirror array for output side 1402B, and the number and the arrangement of the optical fibers 1400 on the fiber array for input side 1401A and the fiber array for output side 1401B are not limited to the ones shown in the structure according to the seventh embodiment as described above.

According to the present embodiment in such a structure, input light 1411 enters from the fiber array for input side 1401A and is reflected by the mirror array for input side 1402A of the mirror array 1402. The light is appropriately reflected from each of the surfaces of the corner mirror 1407 to be led to the mirror array for output side 1402B and further reflected from the mirror array for output side 1402B to be led to the fiber array for output side 1401B, followed by outputting as output light 1412.

Similarly to the case of the seventh embodiment, part of the light 120 incident to the movable mirror 106 passes through the movable mirror 106 as shown in FIG. 2 in the mirror array for input side 1402A (i.e., corresponding to the passing light 121) and is received by the light receiving unit of the light detection device 110 arranged below the movable mirror 106. The passing light 121 received in such a way is subjected to optical-electrical conversion, followed by outputting to the control device 1404 as input light detection signals 1413. In addition to the above, output light detection signals 1414 are similarly obtained in the mirror array for output side 1402B, followed by outputting to the control device 1404.

The control device 1404 compares the input light detection signals 1413 to the output light detection signals 1414 output from each light detection device 110 of each of the micromirror elements 100 of the mirror array for input side 1402A and the mirror array for output side 1402B, respectively. Based on the comparison results, the control device 1404 carries out feedback control, detection of malfunction, and the like.

The same effect as that described in the sixth embodiment is produced in the present embodiment as well.

According to the micromirror element of the present invention, a micromirror element with a light detection function at low cost can be realized, and moreover, an effect that a decrease in cost of an optical switch can be achieved.

Furthermore, it is not necessary to provide the light detecting unit separately from the micromirror element because the light detecting unit is provided inside the element. Moreover, since the mirror body and the light detecting unit are provided separately from each other, the yield rate of the mirror body and the yield rate of the light detecting unit do not synergistically affect the yield rate of the micromirror element at the time of fabrication of the micromirror element, which allows improvement in the yield rate of the micromirror element.

Moreover, it is possible to realize a micromirror element in which reduction in cost is achieved. In addition, an optical switch that is suitable for crossconnect and WDM technology and satisfies both excellent performance and cost reduction can be realized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A micromirror element comprising:
a mirror body that is arranged on a substrate via a support, the mirror body having a frame and a movable mirror swayably supported by the frame, and the mirror body being formed so as to allow part of incident light to pass through the movable mirror; and
a light detecting unit that is arranged on the substrate and detects the light having passed through the movable mirror, wherein
the mirror body and the light detecting unit are provided separately from each other;
wherein the movable mirror has a light transmitting hole, and part of the incident light passes through the movable mirror via the light transmitting hole,
wherein the light transmitting hole has a structure that can keep an effective incident area constant for an inlet of the light transmitting hole used for light incident to the light transmitting hole even when a relative position of the movable mirror to the light incident to the movable mirror varies; and
wherein the light transmitting hole has a tapered form in cross section of which area becomes larger from the inlet of the light transmitting hole toward an outlet of the light transmitting hole.

2. The micromirror element according to claim 1, wherein the movable mirror is a half mirror that allows part of incident light to pass through the movable mirror and reflects the rest of the incident light.

3. The micromirror element according to claim 2, further comprising a condensing unit that is provided between the movable mirror and the light detecting unit.

4. The micromirror element according to claim 1, wherein a light detecting portion of the light detecting unit is divided into plural parts.

5. The micromirror element according to claim 1, wherein the light detecting unit is fabricated directly on the substrate.

6. The micromirror element according to claim 1, wherein the light detecting unit is a photodiode.

7. The micromirror element according to claim 1, wherein the movable mirror includes a first electrode, the frame includes a second electrode, and the movable mirror is swayed by an electrostatic force generated between the first electrode and the second electrode by applying a voltage to these electrodes.

8. A micromirror element comprising:
a mirror body arranged on a substrate via a support, the mirror body having a frame and a movable mirror swayably supported by the frame, and the mirror body is formed so as to allow part of incident light to pass through the movable mirror; and
a light detecting unit that is arranged on the substrate and detects the light having passed through the movable mirror,
wherein the movable mirror has a light transmitting hole, and part of the incident light passes through the movable mirror via the light transmitting hole,
wherein the mirror body and the light detecting unit are provided separately from each other;
wherein the light transmitting hole has a structure that can keep an effective incident area constant for an inlet of the light transmitting hole used for light incident to the light transmitting hole even when a relative position of the movable mirror to the light incident to the movable mirror varies; and
wherein the light transmitting hole has a tapered form in cross section of which area becomes larger from the inlet of the light transmitting hole toward an outlet of the light transmitting hole.

9. The micromirror element according to claim 8, wherein the light transmitting hole is formed at substantially a center of the movable mirror.

10. The micromirror element according to claim 9, wherein the light transmitting hole has such a structure that transmission factor of light is highest at the center and the transmission factor of light decreases with a distance from the center.

11. The micromirror element according to claim 8, further comprising a condensing unit that is provided between the movable mirror and the light detecting unit.

12. An optical switch comprising:
an optical fiber array for input side to which light is input;
a mirror array for input side that reflects the light output from the optical fiber array for input side;
a mirror array for output side that reflects the light output from the mirror array for input side;
a fiber array for output side that outputs the light output from the mirror array for output side; and
at least one of the mirror array for input side and the mirror array for output side includes a micromirror element that has
a mirror body that is arranged on a mirror substrate and supported via a support, the mirror body having a frame and a movable mirror swayably supported by the frame, and the mirror body being formed so as to allow part of incident light to pass through the movable mirror; and
a light detecting unit that is arranged on a wiring substrate and detects the light having passed through the movable mirror, wherein the mirror substrate and the wiring substrate are provided separately from each other;

the movable mirror has a light transmitting hole, and part of the incident light passes through the movable mirror via the light transmitting hole, the light transmitting hole has a structure that can keep an effective incident area constant for an inlet of the light transmitting hole used for light incident to the light transmitting hole even when a relative position of the movable mirror to the light incident to the movable mirror varies; and the light transmitting hole has a tapered form in cross section of which area becomes larger from the inlet of the light transmitting hole toward an outlet of the light transmitting hole.

13. The optical switch according to claim 12, further comprising a controlling unit, wherein any one of detection signals for input light and detection signals for output light or both that are detected by each of the light detecting units of the micromirror elements that receives a light detection signal corresponding to the light detected by the light detecting unit in any one of the mirror array for input side and the mirror array for output side or both constituted of the micromirror elements, are output to the controlling unit, and the controlling unit carries out feedback control based on any one of the detection signals for input light and detection signals for output light or both the light detection signal.

* * * * *